Patented Nov. 16, 1943

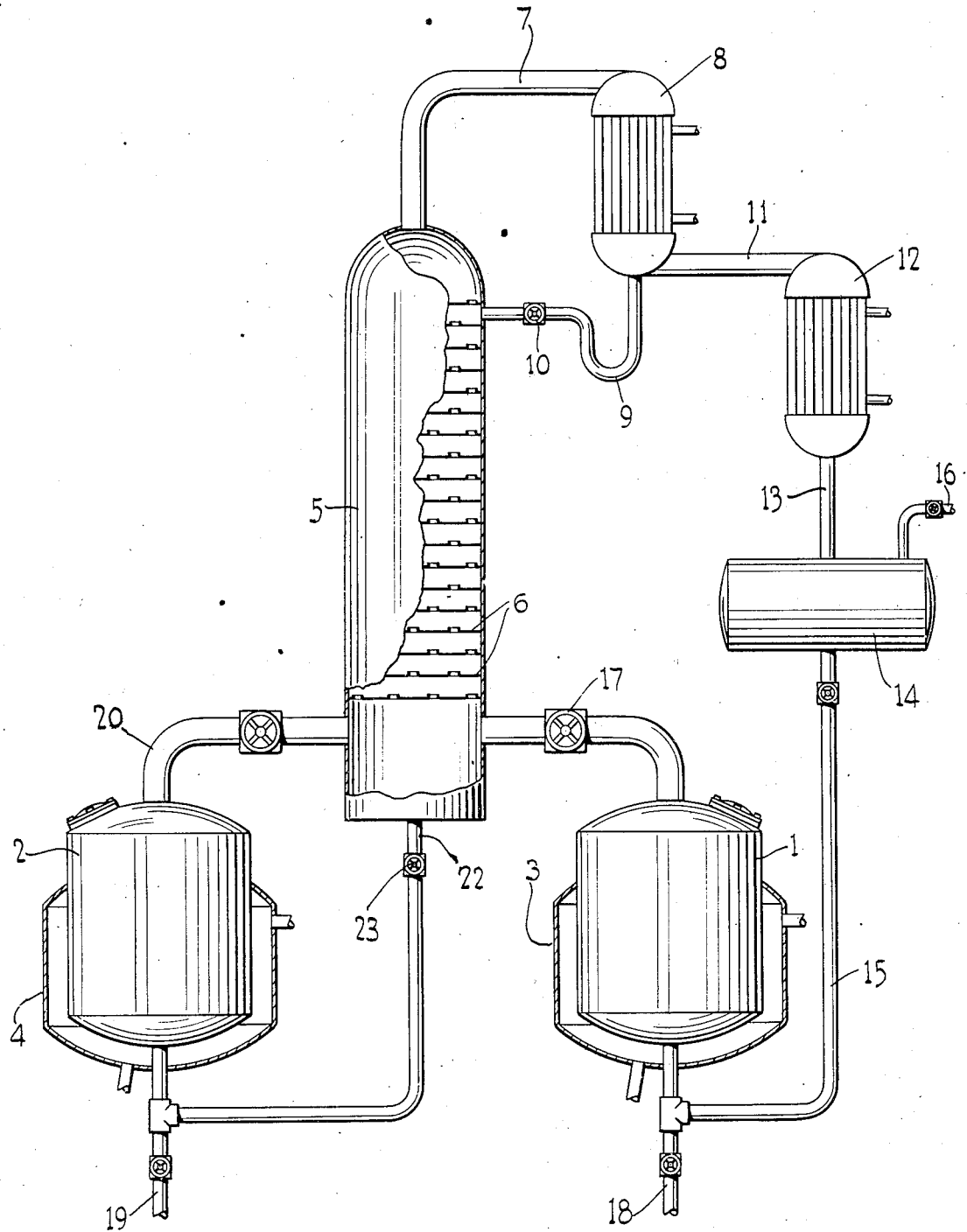

2,334,524

UNITED STATES PATENT OFFICE 2,334,524

PURIFYING HYDROXY ALIPHATIC ACIDS

Henry Wenker, Elizabeth, N. J., assignor to Apex Chemical Co., Inc., Elizabeth, N. J., a corporation of New York Application April 14, 1942, Serial No. 438,929

2 Claims. (Cl. 260—535)

This invention relates to purifying hydroxy aliphatic acids and is herein described in some detail as embodied in a practically continuous process for distilling lactic acid in the form of methyl lactate, hydrolyzing the methyl lactate ester into lactic acid, which is collected, and methanol, which is returned for reuse.

Inorganic salts of lactic acid fail to crystallize satisfactorily to enable them to be used for steps in the process of purifying the acid.

Dehydrating the crude acid, and subjecting it to vacuum distillation, and other steps, have proved expensive and wasteful and unsatisfactory generally.

Converting an organic acid like lactic to an ester, for the purpose of purifying it, involves certain complications peculiar to hydroxy acids, of which lactic acid is one, because the conditions that favor the production of the ester methyl lactate, for example, also favor the production of the undesired lactyl ester of lactic acid, and also probably favor production of undesirable complex lactyl and methyl-lactyl ester.

Attempts have been made to avoid these and other difficulties by combining the lactic acid with an organic base like aniline to form crystals, washing the crystals and then separating the organic base from the acid.

That process requires close attention, and in the case of aniline requires the use of refrigeration at one stage and heating at another stage. Moreover, unless the washing of the crystals is very carefully watched and adjusted for each variation of impurities, the loss of acid seems to be a serious item.

It has also been proposed to selectively oxidize impurities, but that procedure requires the utmost care and many precautions have had to be observed.

It has also been proposed to prepare esters of lactic acid, filter off impurities from their fairly dilute solution in methanol, and then partially hydrolyze the ester to lactic acid, distilling off excess methanol and unconverted ester. This process usually involved the use of ten to twenty moles of methanol, and the handling of that methanol solution.

According to the present invention, the foregoing and other difficulties and objections are avoided and overcome, and, in the form described in detail, crude lactic acid is purified by a process using only cheap materials, most of which are recovered, and a process which requires almost no attention beyond the charging and discharging of materials and the neutralization of a little mineral acid used.

According to the present invention, a relatively low excess of an alcohol such as methanol is charged into a still with 85% crude lactic acid and a little mineral acid, such as sulfuric acid to serve as a catalyst. The mixture is heated and the ester, such as methyl lactate begins to distill. The ester methyl lactate, coming off, mixed with some water vapor and more methanol vapor, is shown as separated in a reflux condenser so that the methyl lactate is condensed, flowing into another container, while the methanol which passes on is shown as condensed in a second or second and third condenser, and returned to the crude lactic acid, so that the relative excess of methanol is continuously increased by the returning excess distilled methanol.

It is found advantageous to collect the methyl lactate in a relatively large amount of water so that it tends to hydrolyze, setting free the combined methanol which may be returned to the crude lactic acid. This hydrolyzing is shown as aided by heat and by a little free mineral acid, preferably chemically pure sulfuric acid, which is easily removed by a suitable precipitant, as an alkaline earth salt or hydroxide. The U. S. P. lactic acid is readily obtained by concentrating the 55% to 60% product.

It is possible to work the process practically as a continuous one, by passing the distillate first through a roughly separating reflux condenser, then condensing out all vapor except methanol, and finally condensing the methanol and returning it to the crude lactic acid. Additional charges of crude lactic acid may be added, and the collected distillate removed from time to time, with make-up C. P. acid added to the distillate. It often seems preferable with ordinary commercial lots of lactic acid to clean out the distilling tank after each bath and remove the impurities and recover the sulfuric acid and recharge the fairly clean tank.

The accompanying drawing illustrates diagrammatically a simple effective form of commercial apparatus for carrying out the present invention.

In the closed copper tank 1 were placed about 1500 lbs. of 80% crude lactic acid containing the usual impurities of sugars, albumen, mineral salts, and other substances difficult to separate by ordinary processes. With this was put 750 lbs. (about 1½ moles) pure anhydrous methanol and 26 lbs. of technical concentrated sulfuric acid.

In the closed glass lined tank 2 was placed 500 pounds of water and 14 pounds chemically pure concentrated sulfuric acid.

Steam at about 30 pounds pressure was then turned on the steam jacket 3 of tank 1 to boil the contents and then, or about as soon as distillation began, steam at about 30 pounds was turned on the steam jacket 4 of tank 2 to boil the contents.

The distillate from tank 1 consisted of water, methyl ester of lactic acid and methanol. The ester was condensed in the separating column 5 which is diagrammatically illustrated as connected by a valved 3 inch pipe 20 to the tank 2 above its bottom end by a valved pipe 22 returning from the bottom of the column 5 to the bottom of the tank 2. The column was found to serve satisfactorily as a reflux condenser when made up of five 2 ft. diameter units with five plates 6 in each; and closed at the bottom, except for pipe 22 which fed condensed water, methyl lactate and some methanol.

In the column 5 was condensed the major part of the ester, some of the methanol and most of the water vapor, and run continuously by the valved pipe 22 into tank 2.

The vapor escaping from the top of column 5 was conveyed by a 3 inch pipe to a dephlegmator or partially effective condenser 8, from which any condensate was usually led by a reflux return pipe 9, provided with a U-shaped bend or trap and valve 10, to the column 5 near its top.

The uncondensed vapors, methanol, containing small amounts of methyl lactate, were carried by a pipe 11 to a second condenser 12 where all the remaining methanol was condensed, and led thence, by a pipe 13, to or through a storage tank 14, provided with a valved top vent 15.

The condensed, now liquid, methanol in the tank 14 was usually returned continuously, by a valved pipe 16 through the tank 1 for further use in completing the same batch.

The methyl lactate in tank 2 was continuously hydrolyzed under the influence of the hot sulphuric acid present, and the methanol thus liberated was returned to circulate through tank 1 or to storage in tank 14.

Any lactic anhydrides in the crude lactic acid were transformed into methyl lactate during the latter part of the process, there being present both an increasingly large excess of methanol and whole of the sulfuric acid catalyst. As a result, the loss by formation of tar is eliminated and the lactic acid material utilized thus increases the economic efficiency of the process.

After the foregoing process was finished, indicated by absence of methyl lactate in the distilling vapors, at which time tank 1 may be almost empty, containing mostly impurities and residual sulfuric acid, the valve 16 under storage tank 14 was closed, the valve 23 in pipe 22 was closed, the tank 1 was freed of methanol, usually requiring a continuing of the heating to boiling for a half-hour, then the valve 17 in the three inch pipe between tank 1 and column 5 was closed, the residue in tank 1 run out by valve diagrammatically shown at 18, and the heating to boiling of tank 2 was continued, usually about 2 hours, until hydrolysis was complete, and the evolved methanol was collected in tank 14.

The whole process usually required eight to ten hours, depending on the size of the batch which was drawn off through a valve diagrammatically shown at 19.

The sulfuric acid present in tank 2 was precipitated in any suitable way as by adding a lactate or carbonate of an alkaline earth metal—23 pounds pure strontium carbonate (nearly the theoretical amount needed) was found satisfactory.

The lactic acid may be purified by decolorizing carbon or may be concentrated as desired. Chlorides may be removed at a suitable stage by precipitation with silver nitrate.

The recovered lactic acid before further concentration usually runs moderately concentrated, or about 55% to 60% and was readily concentrated to 85%–90%, U. S. P. standard.

It is possible to substitute other alcohols, but methanol is somewhat more efficient.

The following examples illustrate comparative results of varied raw materials:

1500 lbs. of 82% crude lactic acid were heated with 970 lbs. denatured ethanol containing ethyl acetate and aviation gasoline as denaturants, and with 26 lbs. technical concentrated sulfuric acid, and in the collecting tank were 500 lbs. water and 13 lbs. C. P. sulphuric acid. The temperature in the distilling tank varied from 95° to 110°; at the top of the column 80° to 85° C. The time of treatment was 12 to 16 hours, yielding 2000 lbs. pure 55% lactic acid after removal of sulfuric acid with 23 lbs. strontium carbonate.

1500 lbs. of 82% crude lactic acid were heated with 1200 lbs. of 98% isopropanol, and 26 lbs. of the same technical sulfuric acid. In the collecting tank were 500 lbs. water and 13 lbs. of the C. P. sulfuric acid. The temperature in the distilling tank was 96° to 120° C.; at the top of the column 83° to 85° C. The time of treatment was 12 to 20 hours and the yield 2000 lbs. of 48% lactic acid.

A normal run with 640 lbs. methanol, 1500 lbs. crude 82% lactic acid, and 26 lbs. sulfuric acid yielded 2000 lbs. of 56.5% pure lactic acid in 12 to 16 hours. The temperature in the distilling tank varied from 94° to 110° C., and at the top of the column 66° to 72° C.

The hydroxy-aliphatic acid glycolic acid was successfully purified by analogous procedure as follows:

1500 lbs. of 70% crude glycolic acid were heated with 640 lbs. methanol and 26 lbs. of the technical concentrated sulfuric acid and collected in the collecting tank which contained 500 lbs. water and 13 lbs. of the sulfuric acid.

The temperature in the distilling tank varied from 96° to 106° C., and at the top of the column 66° to 72° C. The time of treatment was 12 to 16 hours, and the yield 2000 lbs. of 50% glycolic acid, after removal of sulfuric acid.

It was found that ethanol and methanol were about equally effective at a yield of 90 to 92% and isopropanol at 79%. These were the best to use because their boiling points were well below the boiling point of water.

Having thus described one embodiment of the invention in some detail, what is claimed is:

1. The process of purifying crude lactic acid containing approximately 80% to 85% acid, which consists in adding to a batch of the crude acid approximately 1½ mols. methanol per mol. of lactic acid in the batch and a mineral acid catalyst, heating to distill vapors from the mixture, fractionating the vapors to separate methanol from the ester produced, hydrolyzing the fractionated ester to form lactic acid and hydrolyzed methanol, separating the methanol therefrom, and continuously returning methanol from both the fractionating and hydrolyzing steps to the batch until substantially all of the lactic acid has been removed as the ester.

2. The process of purifying crude hydroxy acids selected from the group consisting of lactic and glycolic acids, said crude acid containing approximately 70% to 85% of the acid, which consists in the adding to a batch of the crude approximately 1½ mols. of an alcohol selected from the group consisting of methyl alcohol, ethyl alcohol and isopropyl alcohol and a mineral acid catalyst, heating to distill vapors from the mixture, fractionating the vapors to separate the alcohol from the ester produced, hydrolyzing the fractionated ester to form the pure acid and hydrolzed alcohol, separating the alcohol therefrom, and continuously returning the alcohol from both the separating and hydrolyzing steps to the batch until substantially all of the acid has been removed as the ester.

HENRY WENKER.